(12) United States Patent
Shirley et al.

(10) Patent No.: US 6,253,889 B1
(45) Date of Patent: Jul. 3, 2001

(54) ACCELERATION SENSITIVE SHOCK ABSORBER

(75) Inventors: David A. Shirley, Rancho Palos Verdes, CA (US); James L. Kasprzak, West Bloomfield, MI (US)

(73) Assignee: Ricor Racing and Development, LP, Sutter Creek, CA (US)

( * ) Notice: Subject to any disclaimer, the term of this patent is extended or adjusted under 35 U.S.C. 154(b) by 0 days.

(21) Appl. No.: 09/400,213

(22) Filed: Sep. 21, 1999

Related U.S. Application Data

(63) Continuation-in-part of application No. 08/795,469, filed on Feb. 4, 1997, now Pat. No. 5,954,167.

(51) Int. Cl.[7] .................................................. F16F 9/34
(52) U.S. Cl. ............................................................ 188/275
(58) Field of Search ................................... 188/275, 280, 188/281, 282.1, 280.5

(56) References Cited

U.S. PATENT DOCUMENTS

| | | | |
|---|---|---|---|
| 3,319,741 | * 5/1967 | Hauck | 188/275 |
| 4,254,849 | * 3/1981 | Pohlenz | 188/275 |
| 4,917,222 | 4/1990 | Bacardit | 188/275 |
| 5,598,903 | 2/1997 | Richardson | 188/275 |
| 5,823,305 | 10/1998 | Richardson et al. | 188/275 |
| 5,954,167 | 9/1999 | Richardson et al. | 188/275 |

FOREIGN PATENT DOCUMENTS

| | | |
|---|---|---|
| 19 85 453 | 5/1968 | (DE) . |
| 21 39 942 | 11/1972 | (DE) . |
| WO96/27091 | * 9/1996 | (WO) . |

\* cited by examiner

*Primary Examiner*—Matthew C. Graham
(74) *Attorney, Agent, or Firm*—Christie, Parker & Hale, LLP

(57) ABSTRACT

An acceleration sensitive shock absorber has a tubular housing and a piston assembly in the housing dividing the housing into an upper chamber and a lower chamber. The piston is connected to the wheel of a vehicle and the housing is connected to the chassis of the vehicle. Fluid can pass between the upper and lower chambers with a restricted flow rate during either extension or compression of the shock absorber. There is a port for providing fluid flow from the lower chamber to the upper chamber during downward acceleration of the wheel. A movable inertial mass in the piston assembly opens the port during downward acceleration of the wheel of the vehicle for increasing flow between the chambers. A pocket beneath the inertial mass applies sufficient pressure to the inertial mass to retain it in a port-open position during fluid flow after acceleration has decreased. An enlarged diameter relief portion inside the inertial mass minimizes inconsistent performance in mass produced shock absorbers.

31 Claims, 2 Drawing Sheets

FIG.1
FIG.2
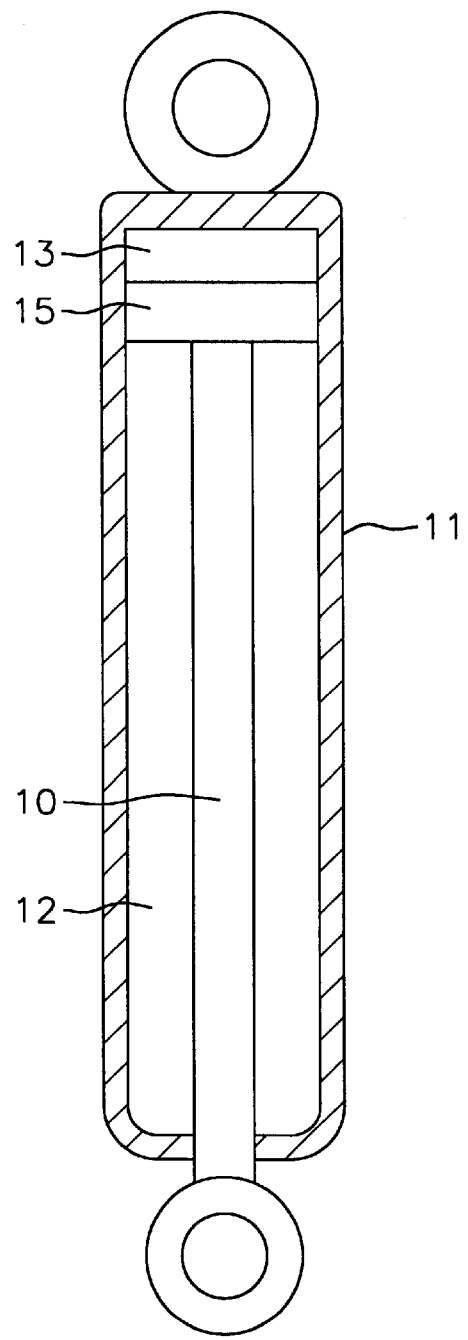
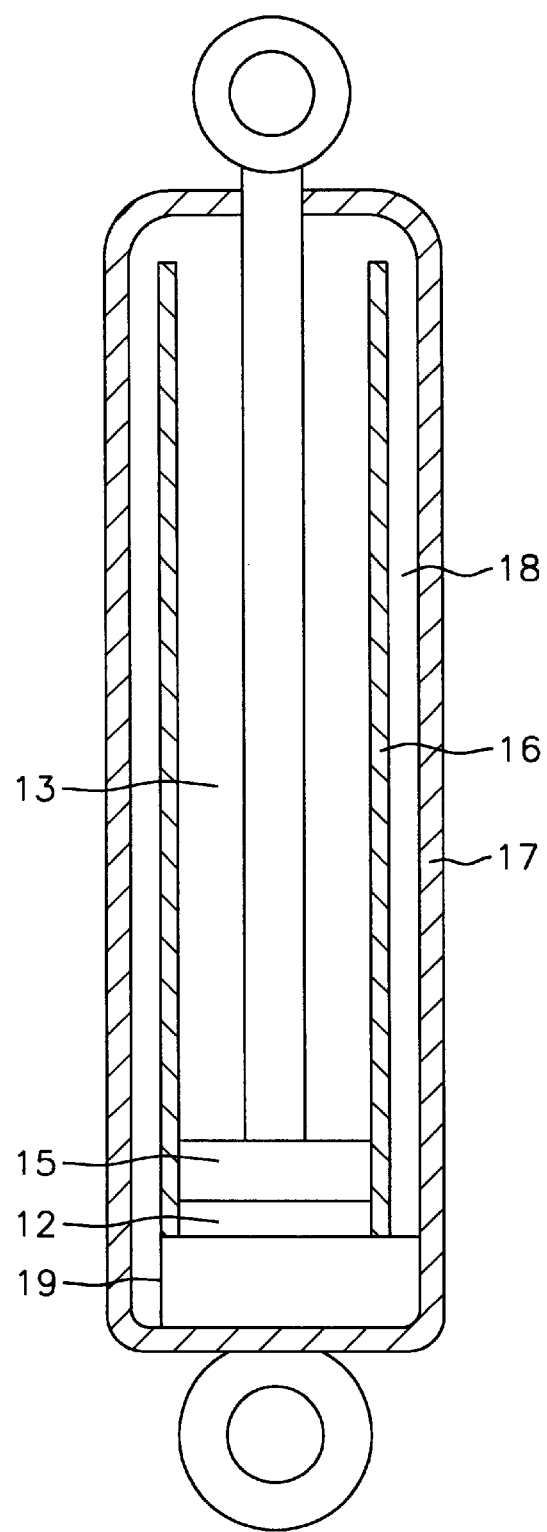

ACCELERATION SENSITIVE SHOCK ABSORBER

This application is a continuation-in-part of U.S. application No. 08/795,469, filed Feb. 4, 1997, now U.S. Pat. No. 5,954,167 the subject matter of which is hereby incorporated by reference.

BACKGROUND OF THE INVENTION

This invention relates to vehicle shock absorbers which are typically mounted between the wheels and chassis or body of an automobile, truck, motorcycle, etc. The invention relates to a shock absorber with damping characteristics that change depending upon the acceleration of parts of the shock absorber, most importantly, during downward acceleration of the vehicle wheel.

Shock absorbers which respond to accelerations of a vehicle wheel have demonstrated a remarkable ability to improve the performance of vehicles equipped with such shock absorbers. One such shock absorber has a movable inertia valve for opening a port during downward acceleration of the vehicle wheel. The acceleration sensitive shock absorber further includes means for biasing the inertia valve towards its open position in response to fluid flow through the shock absorber.

It is desirable to apply an upwardly directed spring load to the inertia valve in the shock absorber to reduce the effects of gravity. Ideally, the inertia valve is a pure inertial element unaffected by gravity. As the inertia valve approaches a weightless condition, the more sensitive it becomes to acceleration inputs and premature opening. A "weightless" inertia valve also becomes sensitive to pressure differentials during non-inertia valve extension events or body motion events. Body motion events create high pressure inside the piston as fluid is metered through the body motion valving.

Some inconsistency in performance was noted in mass produced shock absorbers. It was deduced, that sometimes the inertia valve would open in absence of a downward acceleration of the vehicle wheel. The inertia valve might open due to a body motion rather than a wheel motion. Opening of the inertia valve leads to a reduction in damping force when high forces are necessary to control vehicle body motions. Conversely, it might occur that the inertia valve did not open properly upon downward wheel acceleration.

It is desirable that the inertia valve should consistently open when it should, and should remain closed when it should not be opening. It is desirable to modify the structure only slightly to alleviate such inconsistencies in mass produced shock absorbers.

SUMMARY OF THE INVENTION

There is, therefore, provided in practice of this invention a flow sensitive, acceleration sensitive shock absorber with a tubular housing for connection to one portion of a vehicle and a piston assembly in the housing and a piston assembly in the housing comprising a piston and a piston rod for connection to another portion of the vehicle, one of said portions being a chassis of the vehicle and the other portion being a wheel of the vehicle. Shock absorber fluid passes between portions of the shock absorber through a restricted flow rate path during one of compression or extension of the shock absorber. There is a fluid flow port in a first portion of the shock absorber for bypassing fluid flow past the restricted flow rate path and a movable inertial mass in the shock absorber for opening the port during acceleration of the first portion of the shock absorber for increasing bypass flow of fluid. An improvement in the shock absorber is an increased diameter relief portion inside the inertial mass sufficiently close to the port when the inertial mass is in the port-closed position to avoid unbalanced pressure increase at an end of the inertial mass that would open the port in absence of acceleration a selected portion of the vehicle.

BRIEF DESCRIPTION OF THE DRAWINGS

These and other features and advantages of the present invention will be better understood by reference to the following detailed description when considered in connection with the accompanying drawings wherein:

FIG. 1 is a schematic longitudinal cross-section of an acceleration sensitive shock absorber;

FIG. 2 is a schematic longitudinal cross-section of second, twin tube type shock absorber.

DETAILED DESCRIPTION

Figure 3:
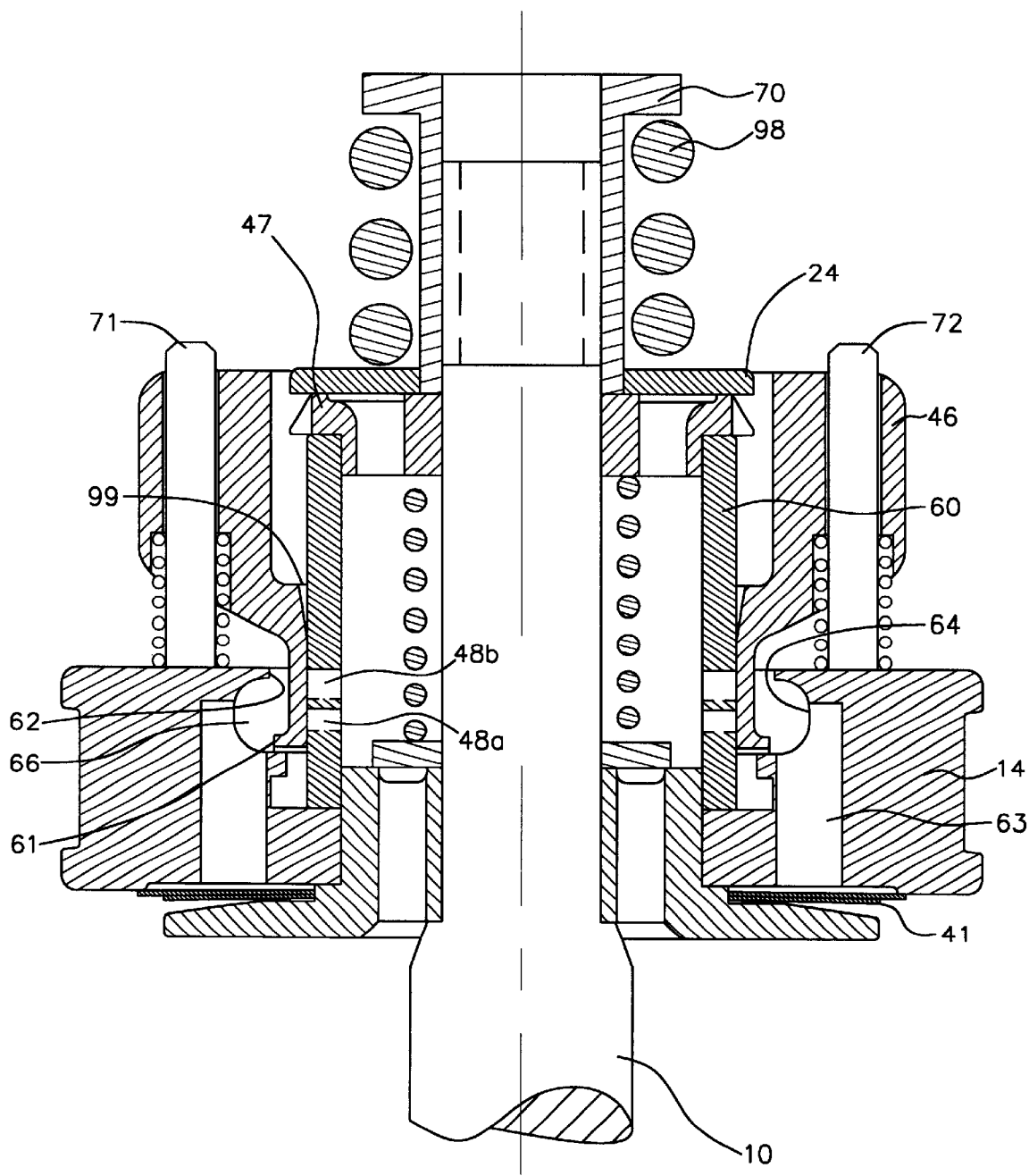
FIG. 3 is a fragmentary longitudinal cross-section of a piston assembly for an acceleration sensitive shock absorber.

The first two drawings illustrate schematically the general arrangement of a single tube shock absorber and a new type of twin tube shock absorber, respectively, which are acceleration sensitive. In FIG. 1 a piston assembly 15 is on a piston rod 10 connected to the wheel (not shown) of a vehicle. The piston assembly is mounted in the hollow cylindrical body 11 of the shock absorber, which is connected to the frame or chassis (not shown) of the vehicle. The piston assembly divides the interior of the cylinder 11 into a lower chamber 12 below the piston and an upper chamber 13 above the piston. The rest of the shock absorber, including means for connecting to the vehicle is conventional and need not be illustrated for an understanding of this invention. An inertia valve described with respect to FIG. 3 is in the piston assembly for making the shock absorber acceleration sensitive.

It will be understood that references are made to an upper chamber and a lower chamber, since this is the way the shock absorber is normally mounted in a vehicle. In other embodiments, such as a twin tube shock absorber, the shock absorber may be inverted with a tube connected to a vehicle wheel and a piston rod connected to a vehicle chassis. Details of the operative structure differ accordingly.

FIG. 2 illustrates schematically a twin tube type shock absorber which has a piston 15 mounted in an inner tube 16 of the shock absorber. The piston rod 10 is connected to the frame or chassis of a vehicle (not shown). The outer tube 17 of the shock absorber is connected to the wheel of the vehicle (not shown). In the twin tube shock absorber fluid flows between upper and lower chambers 13 and 12 and an annulus 18 between the inner and outer tubes. An inertia valve assembly 19 is mounted in the bottom of the shock absorber and controls flow between the lower chamber and the annulus.

For purposes of this application, the inertia valve assembly in the bottom of the twin tube shock absorber is sufficiently similar to the inertia valve assembly in the piston assembly that only the latter is described in detail herein. Generally speaking, the inertia valve assembly has similar structure and operates similarly to the inertia valve assemblies described in the aforementioned patent application.

When mounted as illustrated in FIG. 1, movement of the piston assembly downwardly occurs during extension of the shock absorber such as, for example, when the wheel moves away from the vehicle as the terrain drops away beneath the vehicle or the wheel rebounds from compression. Alternatively, upon compression of the shock absorber, the piston assembly moves upwardly within the cylinder. Similarly, when mounted as illustrated in FIG. 2, the tubes move downwardly during extension of the shock absorber when the wheel moves away from the vehicle. Upon either of such movements the inertia valve opens. The shock absorber is relatively "stiff" in the absence of downward acceleration of the wheel. When the inertia valve opens upon downward acceleration of the wheel, the shock absorber becomes relatively "softer". Such operation is described in the aforementioned application.

FIG. 3 is a fragmentary longitudinal cross-section of the piston and inertia valve of a monotube embodiment of acceleration sensitive, fluid flow sensitive shock absorber. In this illustration part of the structure of the piston assembly is deleted, since not required for an understanding of the invention.

Thus, what is illustrated in FIG. 3 is a piston 14 on a piston rod 10. There is an intermediate sleeve or barrel 60 between the piston and a longitudinally extending upper sleeve 47. These parts are held to the piston by a nut 70 threaded on the rod. An inertial mass 46 is mounted on the piston. Guide pins 71 on the piston hold coil springs 72 which offset part of the weight of the inertial mass to expedite opening of the inertia valve. Fluid ports 48 through the intermediate sleeve permit bypass fluid flow when the inertia valve opens.

There is a deflected disk valve 41 on the bottom face of the piston and a spring loaded rebound valve 24 at the top of the piston. The rebound valve 24 has deflection characteristics suitable for damping chassis or body motion imposed on the shock absorber and for rebound or upward motion of the vehicle wheel. The disk and rebound valves are merely exemplary of equivalent valves conventionally used in shock absorbers for restrictive fluid flow.

A restricted fluid flow path downstream from the fluid ports 48 is provided by a small annular clearance between the bottom edge or lip 61 of the inertial valve 46 and a shoulder portion 62 on the piston 14, when the inertia valve is open. The relative areas and spacings of the ports 48 and the annular restricted flow path are such that the restricted flow path has a smaller area than the ports when the inertia valve is open. Thus, when the inertia valve is open, the cross-sectional area for fluid flow through the restricted flow path is less than the cross-sectional area for fluid flow through the ports.

Because of this restricted flow path downstream from the ports, there is a higher pressure below the inertia valve member than there is in the upper chamber 13. This hydraulic pressure differential due to the restricted flow path biases the acceleration sensitive inertia valve 46 toward its open position. This upward bias continues as long as there is fluid flow, even after acceleration has concluded. The inertial member has sufficient stroke beyond the initial port-open position that the lip 61 travels beyond the shoulder 62 on the piston.

It has been found to be desirable to rapidly close the inertia valve in the event of compression before the inertia valve is completely closed. In the event of increased pressure in the upper chamber, fluid flows through relief passages 63 through the piston and pops the deflected disk valve 41 open to permit direct fluid flow from the upper chamber to the lower chamber.

The relief passages do not communicate directly from the upper chamber. Instead these passages terminate in an annular internal undercut portion 64 in the piston below the shoulder. This undercut region and the lower end of the inertial mass form a pocket 66 between the ports and the downstream annular restricted flow path.

The shock absorber includes guide pins 71, positioned on the piston 14, and coil springs 72 around the guide pins between the piston and the inertial mass 46 to apply a spring load to the inertia valve to reduce the effects of gravity. The coil springs ideally counteract the gravity force on the inertia valve to suspend the inertial mass in a substantially weightless condition. This permits the inertia valve to open upon very low acceleration of the wheel.

As the inertia valve approaches a weightless condition it becomes more sensitive to acceleration inputs to the piston and fluid flow through the shock absorber. Because the inertia valve becomes more sensitive to fluid pressure effects, such as during automobile body movements, a fluid turning vane 95 is positioned above the rebound retainer sleeve 47. The fluid turning vane vectors the exiting fluid from the body motion valving to apply sufficient fluid force on the inertia member to maintain the valve in a port-closed position during body or chassis motion events.

The fluid turning vane is formed integrally with the rebound valve 24. The fluid turning vane is a disk positioned around the threaded nut 70. The fluid turning vane is dynamic in that fluid forces the rebound valve upwardly against a coil spring 98 held between the rebound valve and an upper lip of the nut 70. The fluid is then directed around the rebound valve retainer sleeve 47 and at least partially radially outwardly.

In this embodiment, the turning vane is the lower surface of the rebound valve member 24. Fluid exiting passages through the inertia valve retainer sleeve 47 impacts against the lower surface of the rebound valve member and is deflected approximately 90°. Wide cuts are made in the radially extending lip of the inertia valve retainer sleeve, approximating half of the circumference. This generates a pressure within the inertia valve counterbore which biases the inertia member downwardly and inhibits undesired opening of the inertia valve during body motion events.

When shock absorbers are mass produced, there are necessarily tolerances on the parts fabricated for assembling a shock absorber. It is desirable for ease of manufacturing to have a reasonably large tolerance on dimensions so that inherent variability in manufacturing can be acceptable. To make parts with tight tolerances is more costly. It has been discovered that a source of inconsistent behavior of an acceleration sensitive shock absorber as described herein, can arise from the tolerances on the outside diameter of the sleeve 60, and the inside diameter of the inertial mass 46, which moves longitudinally along the sleeve.

Some inconsistency in performance was noted in mass produced shock absorbers. It was deduced, that sometimes the inertial mass would "lift off" prematurely or in absence of a downward acceleration of the vehicle wheel. This might cause the opening of the inertia valve due to a body motion rather than a wheel motion. Conversely, it might occur that the inertia valve did not open properly upon downward wheel acceleration. It was deduced that this latter effect might be caused by fluid friction drag in the small annular clearance between the inertial mass and the intermediate sleeve 60. This might occur when the inside dimension of the cylindrical surface of the inertial mass is small and/or when the outside dimension of the cylindrical sleeve 60 is large. If, for example, both of these parts are manufactured close to their outer tolerance limit, the thickness of the annulus between the two parts can be small, and the thin layer of fluid has a higher "friction" than in a wider annulus.

The cause of undesired opening the inertia valve has also been deduced to be a consequence of the annulus between the inertia valve and sleeve. This may be due to the thickness of the annulus being nearer its upper tolerance limit. In the event of a vehicle body motion, for example, fluid pressure can build up inside the intermediate sleeve, and hence, in the ports 48. Even though the annulus between the inertia mass and sleeve is small, the increased pressure may cause some longitudinal fluid leakage through the annulus. It was deduced that since the distance between the lower ports 48a, and the lower end of the piston was smaller than the distance between the upper ports 48b and the opposite end of the piston within the counterbore, there could be more fluid flow in the downward direction than in the upward direction. This could increase pressure in the pocket 66 within the undercut portion of the piston. The increased pressure acting on the lower end of the inertial mass could cause it to open.

A single change in structure alleviates both of these problems. There is, therefore, a short increased diameter relief portion 99 inside the inertial mass. In the illustrated embodiment, the relief portion is in the form of a tapered surface with the smaller diameter end of the taper being adjacent the cylindrical surface in the remaining portion of the inertial mass opposite the ports 48 when the inertia valve is in its port closed position. Preferably, the end of the increased diameter relief portion is approximately the same distance from the ports as the opposite end of the inertial mass is from the ports when the inertial mass is in its port closed position (as illustrated).

With such an increased diameter relief inside the inertial mass, the flow resistance is approximately equal between the upper and lower ends, respectively, of the inertial mass. The resulting balance minimizes any unbalanced pressure increase in the pocket 66, and improves the consistency of mass produced shock absorbers by avoiding unwanted opening of the inertial valve.

Furthermore, because of the increased diameter relief, the total length of the cylindrical surface within the cylindrical mass, is minimized. This significantly reduces the total fluid friction as the inertia mass moves longitudinally along the sleeve, thereby minimizing "sticking" of the inertial mass so that the valve does not open when it should. The length of the cylindrical surface remains long enough to avoid cocking of the inertial mass, which could also cause sticking.

In the preferred embodiment, the increased diameter relief portion is in the form of a taper having an angle of about two degrees between the tapered surface and the axis of the inertial mass, i.e., about two degrees between the tapered surface and the cylindrical surface. Alternatively, the relief may be in the form of a counterbore that is substantially cylindrical, and about the same length as the tapered surface. A tapered surface is preferred since the inertial mass is desirably made by a powder metallurgy process, and a tapered surface is preferred over a counterbore for ease of manufacturing. The increased diameter in the relief is preferably only slightly larger than the diameter in the rest of the inertial mass. It is believed that this also helps prevent cocking of the inertial mass. For example, in one shock absorber, the increased radius to the larger end of the increased diameter relief is only about 0.008 inch.

FIG. 2 illustrates a twin tube shock absorber where an inertia valve assembly 19 is positioned in the bottom of the shock absorber. The internal members of the inertia valve assembly are similar to the inertia valve members described above in the piston assembly of a monotube shock absorber. An inertia mass moves longitudinally along an internal sleeve and opens or closes ports through the sleeve. An enlarged diameter relief portion inside the inertial mass performs as described above. In this embodiment, the internal sleeve is effectively fixed to the tubes of the shock absorber so that it moves downwardly upon downward wheel acceleration. The inertial mass remains in place, opening the fluid flow ports and permitting bypass flow between the lower chamber in the inner tube and the annulus between the tubes.

What is claimed is:

1. An acceleration sensitive shock absorber comprising:
   a tubular housing for connection to one portion of a vehicle;
   a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;
   means for passing shock absorber fluid between the upper chamber and the lower chamber with a restricted flow rate during compression of the shock absorber;
   means for passing shock absorber fluid between the upper chamber and the lower chamber with a restricted flow rate during extension of the shock absorber;
   a port for providing an alternative fluid flow path during one of extension or compression of the shock absorber;
   a movable inertial mass in the shock absorber for opening the port during vertical acceleration of a portion of the shock absorber for increasing flow of fluid, the inertial mass surrounding a cylindrical member;
   a cylindrical surface inside the inertial mass adjacent to the cylindrical member; and
   an increased diameter relief portion inside the inertial mass sufficiently close to the cylindrical surface to avoid unbalanced pressure increase at an end of the inertial mass that would open the port in absence of acceleration of a selected portion of the vehicle.

2. The shock absorber of claim 1 wherein the inertial mass is suspended in a substantially weightless condition by a compression spring which counteracts a gravitational force of the inertial mass.

3. An acceleration sensitive shock absorber comprising:
   a tubular housing for connection to one portion of a vehicle;
   a piston assembly in the housing comprising a piston dividing the housing into an upper chamber and a lower chamber, and a piston rod for connection to another portion of the vehicle, one of said portions being a chassis of the vehicle and the other portion being a wheel of the vehicle;
   means for passing shock absorber fluid between the upper chamber and the lower chamber with a restricted flow rate during compression of the shock absorbr;
   means for passing shock absorber fluid between the upper chamber and the lower chamber with a restricted flow rate during extension of the shock absorber;
   a port for providing an alternative fluid flow between the upper chamber and the lower chamber with a restricted flow rate during extension of the shock absorber;
   a port for providing an alternative fluid flow path during one of extension or compression of the shock absorber;
   a movable interial mass in the shock absorber for opening the port during vertical acceleration of a portion of the shock absorber for increasing flow of fluid, the intertial mask surrounding a cylindrical member;

a cylindrical surface inside the inertial mass adjacent to the cylindrical member; and an increased diameter fluid flow relief portion comprising a tapered surface inside the inertial mass adjacent to the cylindrical surface, the smaller diameter end of the taper being adjacent the cylindrical surface for balancing flow resistance between the port and the opposite ends of the inertial mass.

4. The shock absorber of claim 3 wherein the smaller diameter end of the taper is approximately the same distance from the port as the opposite end of the inertial mass is from the port when the inertial mass is in a port-closed position.

5. The shock absorber of claim 3 wherein the angle of the taper relative to an axis of the cylindrical surface is approximately two degrees.

6. The shock absorber of claim 1 wherein the fluid flow relief portion comprises a counterbore inside the inertial mass, the end of the counterbore being adjacent the cylindrical surface.

7. The shock absorber of claim 1 wherein the end of the counterbore is approximately the same distance from the port as the opposite end of the inertial mass is from the port when the inertial mass is in a port-closed position.

8. The shock absorber of claim 1 wherein the selected portion comprises the wheel of the vehicle.

9. An acceleration sensitive shock absorber comprising:

a tubular housing for connection to one portion of a vehicle;

a piston assembly in the housing comprising a piston and a piston rod for connection to another portion of the vehicle, one of said portions being a chassis of the vehicle and the other portion being a wheel of the vehicle;

means for passing shock absorber fluid between portions of the shock absorber through a restricted flow rate path during one of compression or extension of the shock absorber;

a fluid flow port in a first portion of the shock absorber for bypassing fluid flow past the restricted flow rate path;

a movable inertial mass in the shock absorber for opening the port during acceleration of the first portion of the shock absorber for increasing bypass flow of fluid; and an increased diameter relief portion inside the inertial mass sufficiently close to the port when the inertial mass is in the port-closed position to avoid unbalanced pressure increase at an end of the inertial mass that would open the port in absence of acceleration of the wheel of the vehicle.

10. An acceleration sensitive shock absorber comprising:

a tubular housing for connection to one portion of a vehicle;

a piston assembly in the housing comprising a piston and a piston rod for connection to another portion of the vehicle, one of said portions being a chassis of the vehicle and the other portion being a wheel of the vehicle;

means for passing shock absorber fluid between portions of the shock absorber through a restricted flow rate path during one of compression or extension of the shock absorber;

a fluid flow port in a first portion of the shock absorber for bypassing fluid flow past the restricted flow rate path;

movable inertial mass in the shock absorber for opening the port during acceleration of the first portion of the shock absorber for increasing bypass flow of fluid; and an increased diameter relief portion comprising a tapered surface inside the inertial mass wherein the end of the increased diameter relief portion is approximately the same distance from the port as the opposite end of the inertial mass is from the port when the inertial mass is in a port-closed position.

11. The shock absorber of claim 10 wherein the angle of the taper relative to an axis of the inertial mass is approximately two degrees.

12. The shock absorber of claim 9 wherein the increased diameter relief portion comprises a counterbore inside the inertial mass.

13. The shock absorber of claim 9 wherein the inertial mass is suspended in a weightless condition by a compression spring which counteracts a gravitational force of the inertial mass.

14. An acceleration sensitive shock absorber comprising:

a tubular housing for connection to one portion of a vehicle;

a piston assembly in the housing, comprising a piston dividing the housing into an upper chamber and a lower chamber, and a piston rod for a connection to another portion of the vehicle, one of the portions being the chassis of the vehicle and the other portion being a wheel of the vehicle;

means for passing shock absorber fluid between the upper chamber and the lower chamber;

a port for providing fluid flow between the lower chamber and the upper chamber;

a movable inertial mass in the shock absorber for opening the port during acceleration of the wheel of the vehicle for increasing flow of fluid between the upper chamber and the lower chamber; and an increased diameter relief portion inside the inertial mass sufficiently close to the port when the inertial mass is in the port-closed position to avoid unbalanced pressure increase at an end of the inertial mass that would open the port in absence of acceleration of a selected portion of the vehicle.

15. An acceleration sensitive shock absorber comprising:

a tubular housing for connection to one portion of a vehicle;

a piston assembly in the housing, comprising a piston dividing the housing into an upper chamber and a lower chamber, and a piston rod for a connection to another portion of th vehicle, one of the portions being the chassis of the vehicle and the other portion being a wheel of the vehicle;

means for passing shock absorber fluid between the upper chamber and the lower chamber;

a port for providing fluid flow between the lower chamber and the upper chamber;

a movable inertial mass in the shock absorber for opening the port during acceleration of the wheel of the vehicle for increasing flow of fluid between the upper chamber and the lower chamber; and an increased diameter relief portion comprising a tapered surface inside the inertial mass approximately an equal distance from the port as the opposite end of the inertial mass is from the port when the inertial mass is in a port-closed position.

16. The shock absorber of claim 15 wherein the angle of the taper relative to an axis of the inertial mass is approximately two degrees.

17. The shock absorber of claim 14 wherein the increased diameter relief portion comprises a counterbore inside the inertial mass.

18. The shock absorber of claim 14 herein the selected portion comprises the wheel of the vehicle.

19. An acceleration sensitive shock absorber comprising:
a tubular housing for connection to one portion of a vehicle;
a piston assembly in the housing and a piston rod for a connection to another portion of the vehicle, one of the portions being the chassis of the vehicle and the other portion being a wheel of the vehicle;
means for passing shock absorber fluid between portions of the shock absorber for resisting extension or compression of the shock absorber;
a port for providing bypass fluid flow between portions of the shock absorber for reducing resistance to extension of the shock absorber;
a movable inertial mass suspended in the shock absorber for opening the port during downward acceleration of the wheel of the vehicle for increasing flow of fluid between portions of the shock absorber; and
an increased diameter relief portion inside the inertial mass sufficiently close to the port when the inertial mass is in the port-closed position to avoid unbalanced pressure increase at an end of the inertial mass that would open the port in absence of acceleration of a selected portion of the vehicle.

20. An acceleration sensitive shock absorber comprising:
a tubular housing for connection to one portion of a vehicle;
a piston assembly in the housing and a piston rod for connection to another portion of the vehicle, one of said portions being a chassis of the vehicle and the other portion being a wheel of the vehicle;
means for passing shock absorber fluid between the portions of the shock absorber with a restricted flow rate during extension of the shock absorber;
a port for providing an alternative fluid flow path during one of compression or extension of the shock absorber;
a movable inertial mass suspended in the shock absorber for opening the port during downward acceleration of a portion of the shock absorber for increasing flow of fluid;
restricted fluid flow paths between the port and the opposite ends of the inertial mass; and
a fluid flow relief path sufficiently close to the port when the inertial mass is in the port-closed position to avoid unbalanced pressure increase at an end of the inertial mass that would open the port in absence of acceleration of a selected portion of the vehicle.

21. The shock absorber of claim 20 wherein the restricted fluid flow paths each comprise a cylindrical portion inside the inertial mass adjacent a cylindrical surface of the shock absorber.

22. The shock absorber of claim 20 wherein the fluid flow relief path comprises an increased diameter fluid flow portion inside the inertial mass between an end of one of the restricted fluid flow paths and an end of the inertial mass.

23. An acceleration sensitive shock absorber comprising:
a tubular housing for connection to one portion of a vehicle;
a piston assembly in the housing and a piston rod for connection to another portion of the vehicle, one of said portions being a chassis of the vehicle and the other portion being a wheel of the vehicle;
means for passing shock absorber fluid between the portions of the shock absorber with a restricted flow rate during extension of the shock absorber;
a port for providing an alternative fluid flow path during extension of the shock absorber;
a movable inertial mass suspended in the shock absorber for opening the port during downward acceleration of a portion of the shock absorber for increasing flow of fluid;
restricted fluid flow paths between the port and the opposite ends of the inertial mass; and
an increased diameter fluid relief tapered surface inside the inertial mass between an end of one of dthe restricted fluid flow paths and an end of the inertial mass.

24. The shock absorber of claim 23 wherein the angle of the taper relative to an axis of the inertial mass is approximately two degrees.

25. The shock absorber of claim 22 wherein the increased diameter relief portion comprises a counterbore inside the inertial mass.

26. The shock absorber of claim 20 wherein the selected portion comprises the wheel of the vehicle.

27. An acceleration sensitive shock absorber comprising:
a tubular housing for connection to one portion of a vehicle;
a piston assembly in the housing, comprising a piston dividing the housing into an upper chamber and a lower chamber, and a piston rod for a connection to another portion of the vehicle, one of the portions being the chassis of the vehicle and the other portion being a wheel of the vehicle;
means for passing shock absorber fluid between the upper chamber and the lower chamber;
a port for providing fluid flow between portions of the shock absorber;
a movable inertial mass in the shock absorber for opening the port during acceleration of the wheel of the vehicle for increasing flow of fluid between said portions of the shock absorber; and
an increased diameter relief portion inside the inertial mass sufficiently close to the port when the inertial mass is in the port-closed position to avoid unbalanced pressure increase at an end of the inertial mass that would open the port in absence of acceleration of a selected portion of the vehicle.

28. The shock absorber of claim 27 wherein the selected portion comprises the wheel of the vehicle.

29. An acceleration sensitive shock absorber comprising:
a tubular housing for connection to the chassis of a vehicle;
a piston assembly in the housing comprising a piston dividing the housing into an upper chamber and a lower chamber, and a piston rod for connection to a wheel of the vehicle;
a rebound valve for passing shock absorber fluid through the piston with a restricted flow rate during extension of the shock absorber; and
a movable inertial mass mounted on the piston assembly for moving between a port-closed position and a port-open position during acceleration of the piston, the inertial mass including an inside cylindrical surface and a sufficiently enlarged diameter relief portion at one end of the cylindrical surface to avoid unbalanced pressure increase at an end of the inertial mass that would open the port in absence of acceleration of the wheel of the vehicle.

30. The shock absorber of claim 20 comprising a port adjacent the cylindrical surface when the inertial mass is in a port-closed position and wherein the enlarged diameter relief portion is an approximately equal distance from the port as the opposite end of the cylindrical surface is from the port when the inertial mass is in a port-closed position.

31. An acceleration sensitive shock absorber comprising:
   a tubular housing for connection to the chassis of a vehicle;
   a piston assembly in the housing comprising a piston dividing the housing into an upper chamber and a lower chamber, and a piston rod for connection to a wheel of the vehicle;
   a compression valve for passing shock absorber fluid through the piston with a restricted flow rate during compression of the shock absorber;
   a rebound valve for passing shock absorber fluid through the piston with a restricted flow rate during extension of the shock absorber;
   a port for providing an alternative fluid flow path during extension of the shock absorber;
   a movable inertial mass mounted on the piston assembly for opening the port during downward acceleration of the piston for increasing flow of fluid through the piston; and
   a counterbore in the inertial mass; and
   a tapered surface adjacent the counterbore wherein the angle of the tapered surface relative to an axis of the piston assembly is approximately two degrees.

* * * * *

UNITED STATES PATENT AND TRADEMARK OFFICE
CERTIFICATE OF CORRECTION

PATENT NO.     : 6,253,889 B1                                                        Page 1 of 1
DATED          : July 3, 2001
INVENTOR(S)    : David A. Shirley and James L. Kasprzak It is certified that error appears in the above-identified patent and that said Letters Patent is hereby corrected as shown below:

Column 2,
Lines 5 and 6, replace "in absence of acceleration a" with -- in the absence of acceleration in a --.

Column 5,
Line 4, replace "of undesired opening the" with -- of an undesired opening of the --.

Column 6,
Line 57, replace "absorbr;" with -- absorber; --.
Lines 60-63, after "shock absorber;" delete "a port for providing an alternative fluid flow between the upper chamber and the lower chamber with a restricted flow rate during extension of the shock absorber;".
Line 66, replace "interial" with -- inertial --.

Column 7,
Line 1, replace "intertial" with -- inertial --.
Line 65, before "movable" insert -- a --.

Column 8,
Line 46, replace "of th vehicle," with -- of the vehicle, --.

Column 9,
Line 1, replace "herein" with -- wherein --.

Column 10,
Line 10, replace "of dthe" with -- of the --.

Signed and Sealed this

First Day of October, 2002

*Attest:*

JAMES E. ROGAN
*Attesting Officer*    *Director of the United States Patent and Trademark Office*